United States Patent
Blott et al.

(10) Patent No.: US 6,341,285 B1
(45) Date of Patent: Jan. 22, 2002

(54) SERIAL PROTOCOL FOR TRANSACTION EXECUTION IN MAIN-MEMORY DATABASE SYSTEMS

(75) Inventors: Stephen Michael Blott, Gillette, NJ (US); Henry F. Korth, Lower Gwynedd, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/344,849

(22) Filed: Jun. 28, 1999

(51) Int. Cl.$^7$ .............................................. G06F 17/30
(52) U.S. Cl. .......................... 707/8; 707/201; 707/202; 709/213
(58) Field of Search .......................... 707/8, 102, 103, 707/201, 202, 203, 204, 205; 709/102, 213, 228, 328; 717/3, 4, 6, 9; 711/207; 714/11, 12, 16, 34, 731, 814

(56) References Cited

U.S. PATENT DOCUMENTS

| | | | | |
|---|---|---|---|---|
| 5,940,827 A | * | 8/1999 | Hapner et al. .................. | 707/8 |
| 6,119,173 A | * | 9/2000 | Pullen et al. ................ | 709/328 |
| 6,157,955 A | * | 12/2000 | Narad et al. .................. | 709/228 |
| 6,202,199 B1 | * | 3/2001 | Wygodny et al. ............... | 714/4 |

OTHER PUBLICATIONS

Baulier, Gerald D.; Blott, Stephen M.; Korth, Henry F. and Silberschatz, Avi, Sunrise: A Real–Time Event–Processing System, Bell Labs Technical Journal, Jan.–Mar., 1998, pps. 3–18.

DeWitt, David J.; Katz, Randy H.; Olken, Frank; Shapiro, Leonard D.; Stonebraker, Michael R., and Wood, David; Implementation Techniques for Main Memory Database Systems, pps, 1–8.

Garcia–Molina, Hector and Salem, Kenneth, Main Memory Database Systems: An Overview; IEE Transactions on Knowledge and Data Engineering, vol. 4, No. 6, Dec. 1992, pps. 509–516.

Haas, Laura M.; Chang, Walter; Lohman, Guy M.; McPherson, John; Wilms, Paul F.; Lapis, George; Lindsay, Bruce; Pirahesh, Hamid; Carey, Michael J. and Shekita, Eugene, Starburst Mid–Flight: As the Dust Clears; IEEE Transactions on Knowledge and Data Engineering, vol. 2, No. 1, Mar. 1990, pps. 143–160.

(List continued on next page.)

Primary Examiner—Diane Mizrahi
(74) Attorney, Agent, or Firm—Stroock & Stroock & Lavan LLP

(57) ABSTRACT

A method for improving the performance of a system having a main-memory database which has at least one database containing at least one data item, and having a permanent storage device. The system executes at least one update transaction for modifying the data item to produce update results, and at least one read transaction for reading the data item. The method includes the steps of requiring the update transaction to acquire a database mutex before the update transaction modifies the data item. A timestamp is assigned to the update transaction and to the data item to be updated by the update transaction. After the update transactions updates the data item and before it release the database mutex, the update transaction acquire a mutex associated with the timestamp. Before the update's results are stored to the permanent storage device, the update transaction releases the database mutex. Finally, the update transaction releases the mutex associated with the timestamp after the update's results are stored to the permanent storage device. Before a read transaction is allowed to read the data item, the read transaction must acquire the database mutex. To ensure that the read transaction read data that was committed by the predecessor update transaction, the read transaction must acquire and release the mutex associated with the timestamp before the read transaction terminates.

16 Claims, 9 Drawing Sheets

```
Read transaction(t):
    acquire database mutex
    begin transaction
    perform txn processing steps
    release database mutex
    acquire Q[TS(t)]
    release Q[TS(t)]
    commit (or abort) transaction
```

```
Update transaction(t):
    acquire database mutex
    begin transaction
    perform txn processing steps
    generate log records (or undo effects)
    acquire Q[TS(t)]
    release database mutex
    flush log (if committing)
    release Q[TS(t)]
    commit (or abort) transaction
```

OTHER PUBLICATIONS

Gottemukkala, Vibby; Lehman, Tobin J., Locking and Latching in a Memory–Resident Database System, Proceedings of 18th VLDB Conference, Vancouver, BC, Canada, 1992.

Molesky, Lory D. and Ramamritham, Krithi, Efficient Locking for Shared Memory Database Systems, pp. 1–25.

Lehman, Tobin J. and Gottemukkala, Vibby, The Design and Performance Evaluation of a Lock Manager for a Memory–Resident Database System, pp. 1–22, Jan. 14, 1994.

Bohannon, Philip L.; Rastogi, Rajeev R.; Silberschat, Avi and Sudarshan, S., The Architecture of the Dali Main Memory Storage Manager, Bell Labs Technical Journal, Winter 1997, pp. 36–47.

Lehman, Tobin J., Shekita, Eugene J., Cabrera, Luis–Felipe, An Evaluation of Starburst's Memory Resident Storage Component, IEEE Transactions on Knowledge and Data Engineering, vol. 4, No. 6, Dec. 1992, pp. 555–565.

* cited by examiner

FIG. 1
(PRIOR ART)

```
Read transactions:                  Update transactions:
    acquire database mutex              acquire database mutex
    begin transaction                   begin transaction
    perform txn processing steps        perform txn processing steps
    commit (or abort) transaction       generate log records (or undo effects)
    release database mutex              flush log (if committing)
                                        commit (or abort) transaction
                                        release database mutex
```

FIG. 2

```
Read transaction(t):                Update transaction(t):
    acquire database mutex              acquire database mutex
    begin transaction                   begin transaction
    perform txn processing steps        perform txn processing steps
    release database mutex              generate log records (or undo effects)
    acquire Q[TS(t)]                    acquire Q[TS(t)]
    release Q[TS(t)]                    release database mutex
    commit (or abort) transaction       flush log (if committing)
                                        release Q[TS(t)]
                                        commit (or abort) transaction
```

SERIAL PROTOCOL FOR TRANSACTION EXECUTION IN MAIN-MEMORY DATABASE SYSTEMS

FIELD OF THE INVENTION

This invention relates to main-memory database systems and, in particular to a serial protocol for improved transaction execution in main-memory database systems under certain workloads.

BACKGROUND OF INVENTION

Many applications, particularly in telecommunications, have response-time and throughput requirements which cannot be met by conventional, disk-based database systems. For example, number translation, fraud prevention and pre-pay billing all require database accesses during the critical set-up phase of a telephone call (between the time when the caller completes dialing and when they receive the ring-back tone). These database accesses must meet response-time goals on the order of tens of milliseconds, which is an order of magnitude faster than conventional, disk-based systems can deliver.

Consider, for instance, the problem of detecting and preventing fraudulent use of a telephone network. One approach to this problem is to maintain summaries, termed 'fraud signatures', for each customer. Fraud signatures capture each customer's typically usage pattern, and are updated with each call. They can be used to detect irregular usage patterns—with similarity to known fraudulent patterns—when and if they occur. If a call is identified as potentially fraudulent, then it is rerouted to a voice recognition system for authentication, or to an operator. This application requires a fraud database to be accessed during call set-up, and updated in a timely manner upon call completion. The database workload consists of rifleshot transactions, i.e. short, response-time critical transactions, mainly keyed by customer identifier, with a roughly 50—50 mix of read-only transactions to update transactions.

Another network application requiring database processing during call set-up is toll-free number mapping. In the US, 'toll-free numbers' are those where the charge for a call is assigned to the callee (rather than to the caller). However, a toll-free number is also mapped (within the network) to different terminating numbers based on criteria such as the day, the time of day, and the load-balancing policies in effect. For example, calls using the same toll-free number may be mapped to an eastern location during the morning, and to a western location in a different time zone during the evening and at night. During the day, a load-balancing algorithm may be used to distribute calls between these two locations. For this application, the database workload again consists of response-time critical, rifleshot transactions, mainly keyed by the toll-free number. While there may be tens of millions of read-only transactions per day, there are typically only a few thousand updates.

These applications—and other similar network applications—exhibit the following characteristics and requirements:

The predominance of short, 'rifleshot' transactions, where each transaction consists of one or a small number of keyed table accesses using existing indexes that are frequently hashed;

In many cases (including those mentioned above), predictable response times—on the order of only tens of milliseconds—are required such that transaction processing can take place during the critical set-up phase of a telephone call; and Transactions do not block while processing for factors such as user input or disk I/O (other than for logging).

To meet the demands of such applications, a main-memory database system ("MMDBS") is often used. A main-memory database system is a database system in which all database data is normally resident in high-speed main memory (e.g. random access memory). Secondary memory, which is slower than main memory (e.g. disk storage), is used only for logs, checkpoints, and archive copies of the database. During normal processing, the only I/O operations to secondary memory are those for logging and checkpointing.

To illustrate the performance of MMDBS' consider the existing MMDBS described in Bohannon, The Architecture of the Dali Main Memory Storage Manager, The Bell Technical Journal, 2(1):36–47, Winter 1997). In a competitive performance evaluation comparing such a MMDBS to a commercial, disk-based relational Data Base Management System (RDBMS) (using an update-intensive telecommunications application), the MMDBS demonstrated both throughput and response times an order of magnitude better than its disk-based counterpart. With falling memory prices, general-purpose main-memory database systems have become a cost-effective alternative to custom systems, and are increasingly being used for applications with stringent performance requirements.

Many architectural issues must be reconsidered in the design of an MMDBS, one of which is concurrency. Disk-based systems execute transactions concurrently in order to improve both throughput and response time. Concurrency allows one transaction to continue processing while another is blocked waiting for an I/O operation to complete. If several transactions generate I/O requests at roughly the same time, then those requests can be scheduled in an order which optimizes some metric such as throughput, or CPU utilization. In order to prevent anomalies due to interference between concurrent transactions, many database systems use locking protocols such as strict two-phase locking (or 'strict 2PL'). (See e.g. Bernstein, concurrency Control and Recovery in Database Systems, Addison Wesley, 1987). Under strict 2PL, locks are acquired before database operations are executed, and released only when the transaction either commits or aborts. Therefore, a read transaction will have access to a database file only after a previous update transaction commits and the read transaction will never view the modifications resulting from an update transaction that were uncommitted and later unwound.

While strict 2PL ensures correctness, the acquiring and releasing locks generate a system overhead that has an adverse impact on both throughput and response time. Also, locking protocols are generally prone to deadlock and unpredictable response times which further affects system performance. Nevertheless, in disk-based database systems, these effects are marginalized by the performance advantages of concurrent execution.

In MMDBSs, however, the locking overhead resulting from the use of locking protocols has a serious impact on system performance. Thus, there is an unmet need in the prior art to provide a transaction execution protocol for MMDBSs that assures that only committed data is accessible and that also eliminates the overhead associated with the prior art locking techniques.

SUMMARY OF THE INVENTION

The present invention is directed to overcoming the shortcomings of the prior art. The present invention provides a method for improving the performance of a system having a main-memory database which has at least one database containing at least one data item, and having a permanent storage device. The system executes at least one update transaction for modifying the data item to produce update results, and at least one read transaction for reading the data item. The method of the present inventions includes the steps of requiring the update transaction to acquire a database mutex before the update transaction modifies the data item. As is known in the art, a mutex is generally defined as a synchronization object that allows multiple threads to serialize their access to shared data. Next a timestamp is assigned to the update transaction and to the data item to be updated by the update transaction. After the update transaction updates the data item and before it release the database mutex, the update transaction acquires a mutex associated with the timestamp. Before the update results are stored to the permanent storage device, the update transaction releases the database mutex. Finally, the update transaction releases the mutex associated with the timestamp after the update results are stored to the permanent storage device. Before a read transaction is allowed to read the data item, the read transaction must acquire the database mutex. To ensure that the read transaction read data that was committed by the predecessor update transaction, the read transaction must, before terminating, acquire and release the mutex associated with the timestamp. Accordingly, by using the method of the present invention, a transaction execution protocol for MMDBSs is provided that assures only committed data is accessible. Also, because the method of the present invention forces transactions that are vying for the same data item to execute serially, the overhead associated with the prior art locking techniques is eliminated.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views:

FIG. 1 is a pseudo-code listing of a prior art protocol for serial transaction execution;

FIG. 2 is a pseudo-code listing of the serial protocol of the present invention;

FIG. 3(*b*) is a graph showing the maximum throughput results as a function of the update rate using the serial protocol of the present invention for a multiprogramming level of 5;

FIG. 3(*c*) is a graph showing the maximum throughput results as a function of the update rate using the serial protocol of the present invention for a multiprogramming level of 15;

FIG. 3(*d*) is a graph showing the maximum throughput results as a function of the update rate using the serial protocol of the present invention for a multiprogramming level of 35;

FIG. 4(*b*) is a graph showing the average response time as a function of throughput using the serial protocol of the present invention for a multiprogramming level of 35 and an update rate of 10%;

FIG. 4(*c*) is a graph showing the average response time as a function of throughput using the serial protocol of the present invention for a multiprogramming level of 35 and an update rate of 33%;

FIG. 4(*d*) is a graph showing the average response time as a function of throughput using the serial protocol of the present invention for a multiprogramming level of 35 and an update rate of 100%;

FIG. 5(*b*) is a graph showing the average response time as a function of the number of processors for a workload without data contention using the serial protocol of the present invention;

FIG. 6(*b*) is a graph showing the average response time as a function of the number of processors for a workload without data contention with concurrency between readers using the serial protocol of the present invention;

FIG. 7(*b*) is a graph showing the average response time as a function of the number of processors for a workload without data contention with concurrency between readers with one database site per processor using the serial port of the present invention.

DETAILED DESCRIPTION OF THE PREFERRED EMBODIMENTS

Figure 3A:
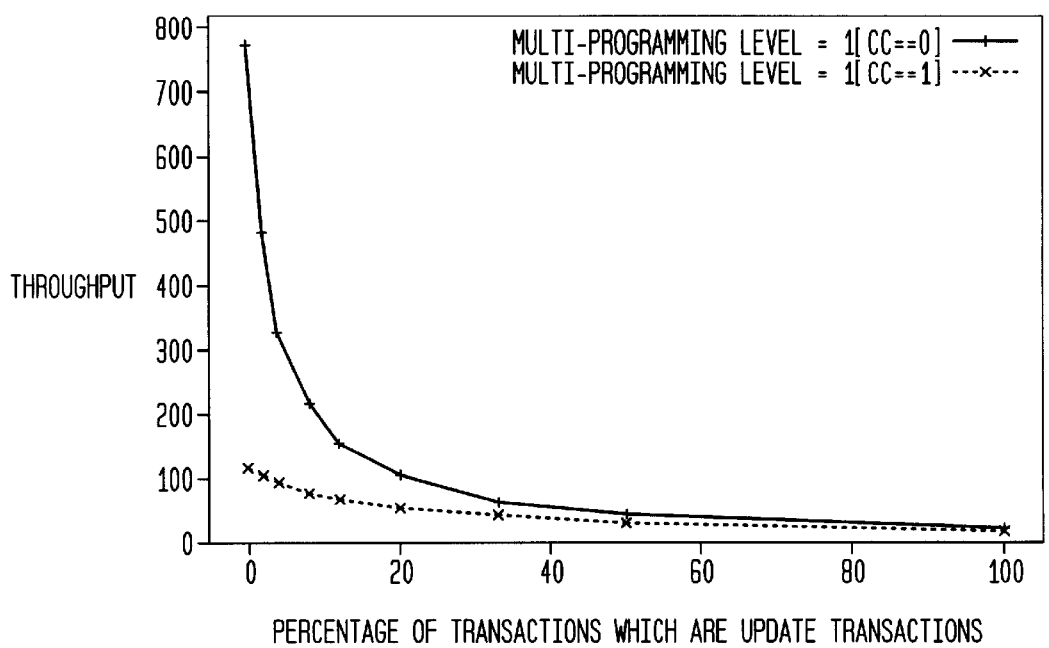
FIG. 3(*a*) is a graph showing the maximum throughput results as a function of the update rate using the serial protocol of the present invention for a multiprogramming level of 1.
Figure 3B:
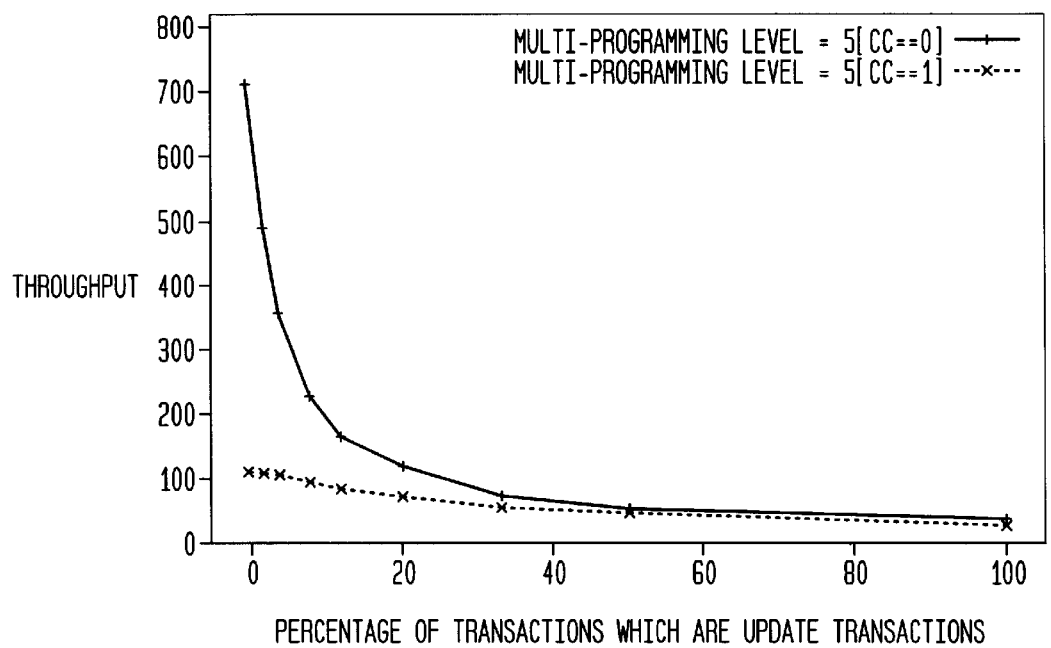
Figure 3C:
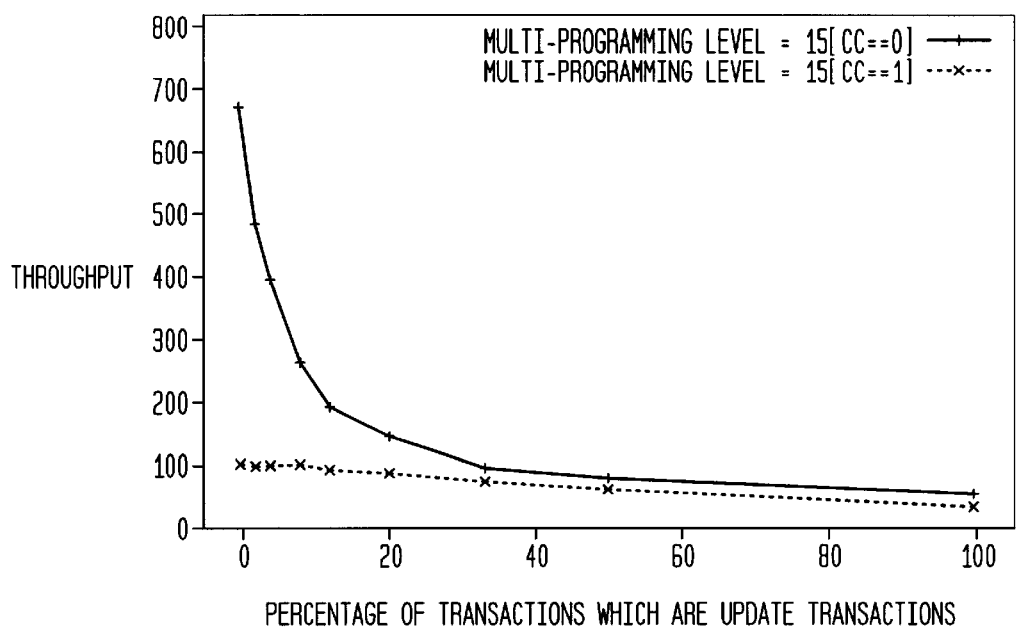
Figure 3D:
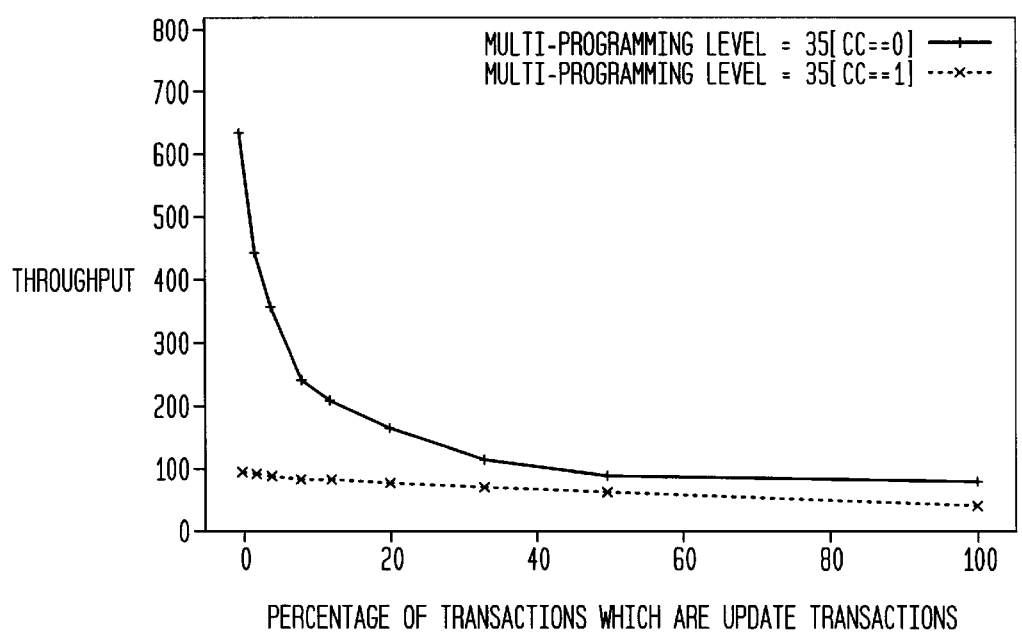
Figure 4A:
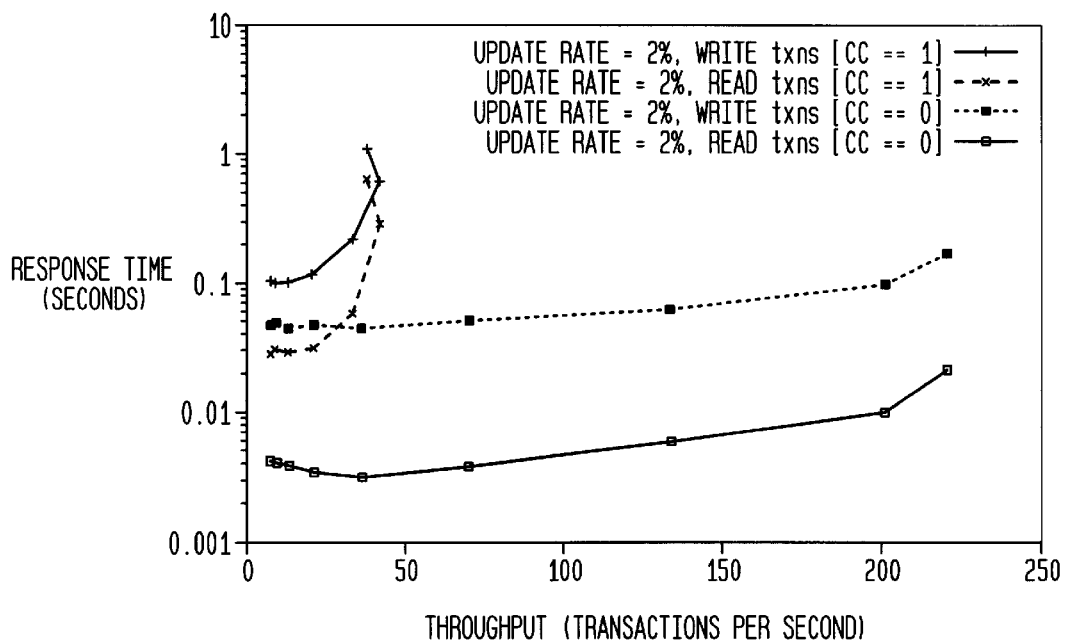
FIG. 4(*a*) is a graph showing the average response time as a function of throughput using the serial protocol of the present invention for a multiprogramming level of 35 and an update rate of 2%.
Figure 4B:
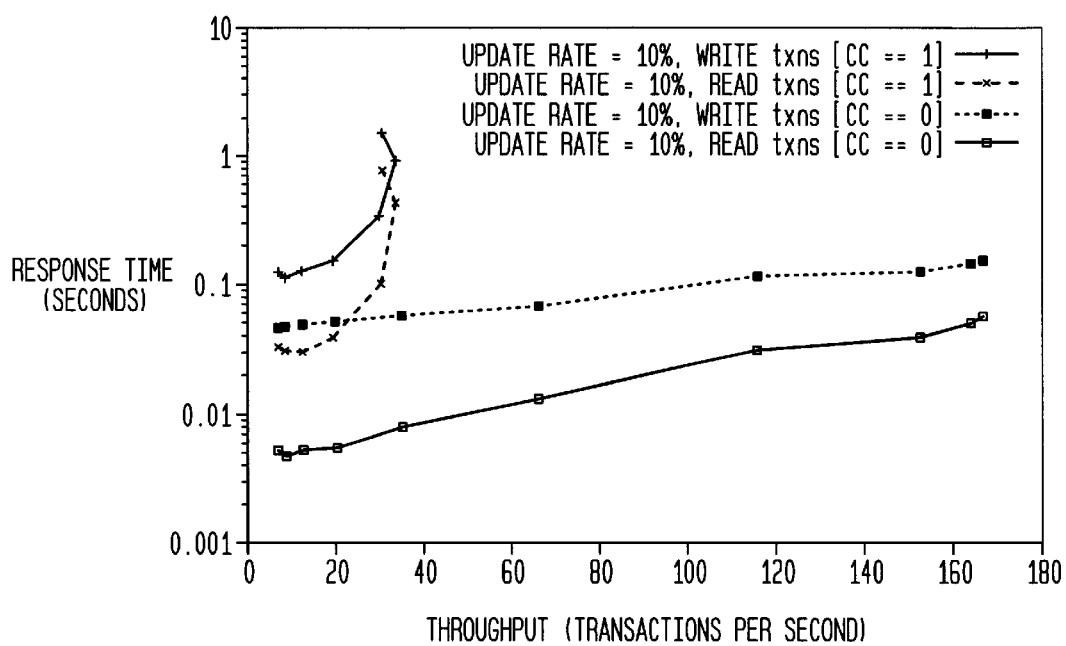
Figure 4C:
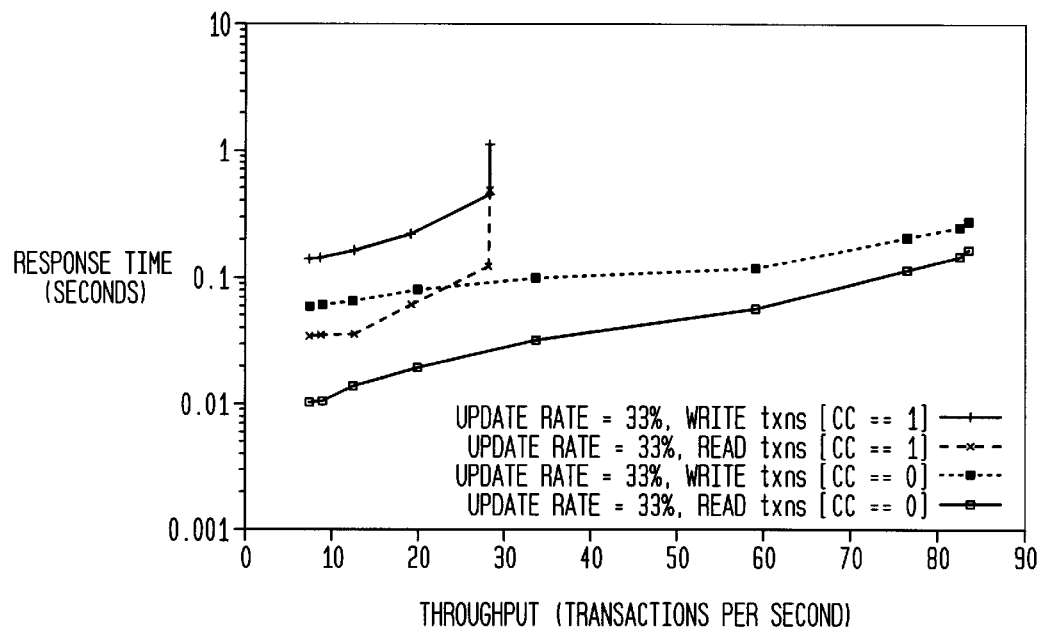
Figure 4D:
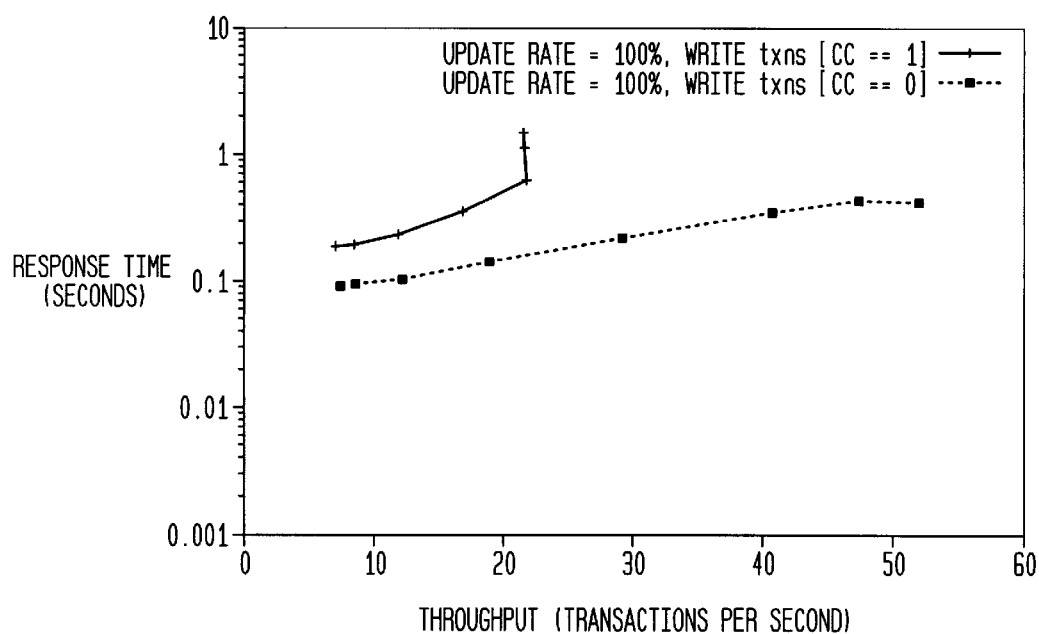

The following describes a protocol for transaction execution in MMDBS that assures that only committed data is accessed and that eliminates the overhead of the prior art locking schemes. The protocol of the present invention is a serial protocol (SP) which has several advantages over the prior art locking protocols which are generally concurrent protocols. To illustrate these advantages, assume two transactions, A and B with A consisting of steps $a_1, a_2, a_3$ and B consisting of steps $b_1, b_2, b_3$. Under concurrent execution of transactions A and B, the respective transactions steps may be performed in the following order:

$a_1, b_1, a_2, b_2, a_3, b_3$

In contrast, under serial execution, the steps may be executed as follows:

$a_1, a_2, a_3, b_1, b_2, b_3$

The advantage of serial execution over concurrent execution is that transaction A is completed earlier in serial execution while transaction B is completed no later than in concurrent execution. Also, the system overhead required to interleave the transaction steps in concurrent execution B is eliminated in serial execution. More importantly, however, is that in serial execution the resource intensive database locking protocol is eliminated and replaced with a simpler low-overhead mutex scheme to prevent simultaneous database accesses and assure that only committed data is made available.

Multi-threaded systems provide a process structure in which several processes—each process executing a transaction—access a shared database system. A single database mutex is provided to ensure mutual exclusion of database accesses. Thus, while one process holds the database mutex, any other process requesting the mutex in order to gain access to the database is blocked until the first process releases the database mutex.

Referring now to FIG. 1, there is shown an example using a database mutex to force the serial execution of transactions. Prior to issuing its first operation, each transaction ensures that no other transaction is active by first trying to acquire the database mutex. The transaction that first acquires the database mutex executes first. Because the need to first acquire the database mutex ensures that no two transactions are ever active at the same time, database locks need not be acquired and deadlock cannot occur.

Assume the update transaction in FIG. 1 acquires the database mutex first. The update transaction steps will then be performed and the effects of the update transaction—changes to the database file in main memory—will result. Next, a log of the update transaction is written to a log buffer contained in main memory. The log buffer will contain sufficient information to either redo or undo the effects of the update transaction. Next the log is flushed (and the effects of the transaction committed) in which case the contents of the log buffer are stored to a disk thereby creating a non-volatile record of the transaction. Once the commitment is acknowledged (i.e. the log buffer was successfully stored to disk), the update transaction releases the database mutex for acquisition by another transaction.

Clearly, executions governed by this protocol are serial. Moreover, the overhead of this protocol—that is the costs of acquiring and releasing the database mutex once per transaction—is low enough to be considered insignificant. In contrast, for lock-based protocols, acquiring a single lock can itself involve first acquiring and then releasing several mutexes, in addition to those operations necessary to create and/or update the lock data structures themselves. Thus, using a serial protocol overcomes the drawback of the prior art concurrent protocols.

Referring now to FIG. 2, there is shown the serial protocol (SP) in accordance with the present invention. The advantage of SP is that it provides improved performance over merely executing transactions serially as described above by allowing the overlap of transaction steps of copending update and read transactions while still assuring that only data committed by the update transaction is made available to pending read transactions. The SP is based on two mechanisms: the use of timestamps, and a mutex-based queue. Timestamps are used to determine, for each read-only transaction, the identity of the most recent predecessor update transaction from which that transaction reads. The mutex-based queue is used to ensure that a read-only transaction is blocked exactly until that predecessor completes its commit processing for a particular data item.

Using the timestamp mechanism, a timestamp is associated with every transaction and with every data item that is operated on by an update transaction. In addition, a global counter records the value of the most recent timestamp which has been allocated. Initially, all data-item timestamps and the global counter are set to 0. When each transaction begins, its timestamp is set to 0. For every read operation a transaction performs, its timestamp is updated to be the greater of its current value and the value of the timestamp of the item being read. Immediately before an update transaction performs its first update operation, the global counter is incremented by 1, and the update transaction's timestamp is set to be this new value of the global counter. Whenever an update transaction performs an update operation, it also updates the timestamp associated with the data item being updated to the value of the transaction's timestamp. For read transactions, the timestamp value when the read transaction completes indicates the most recent predecessor update transaction from which the transaction reads. For update transactions, the timestamp value when the transaction completes indicates that transaction's position in the sequence of all update transactions. Note that, in the SP of the present invention, new timestamps are only assigned for update transactions. Also, in the event the system fails and the timestamp information is lost, as part of the recovery process the system resets all timestamps and the global counter to 0. That is, timestamps and the global counter can be allocated in an area of transient memory, and need not be logged to disk Moreover, the global timestamp requires no special treatment with respect to concurrency since transactions are executed serially.

The SP also includes a commit protocol that utilizes an array of mutexes Q. Let TS(t) denote the timestamp value associated with transaction t when t commmits. When an updated transaction t intends to commit, it acquires Q[TS(t)]—that is, the mutex in position TS(t) in array Q—prior to releasing the database mutex, as is shown in FIG. 2. Q[TS(t)] is then held until t receives the acknowledgment that its commit record has been written to disk, at which point Q[TS(t)] is released. Subsequent read-only transactions which read (most recently) from t first release the database mutex, and are then required to acquire Q[TS(t)]—but only instantaneously. By doing so, they ensure that t has in fact completed before they themselves commit.

In an exemplary embodiment TS(t) is a series of integers beginning from 0 and is used as an index for array of mutexes Q so that Q[TS(t)] is the TS(t) position in array Q. Since Q is of finite size, arithmetic on indexes in Q is performed modulo the queue size.

In an exemplary embodiment, the process of acquiring mutex Q [TS(t)] consists of storing in the TS(t) location of array Q a value that indicates that mutex Q[TS(t)] has been acquired. Similarly, the process of releasing mutex Q[TS(t)] consists of storing in the TS(t) location of array Q a value that indicates that mutex Q[TS(t)] has been released.

Referring now to FIG. 2, the SP of the present invention will now be described. Assuming the update transaction executes first, the update transaction acquires a database mutex which prevents all other transactions from accessing the database and therefore ensures serializability. Next, the update transaction begins and performs the transaction processing steps. Once the transaction processing is completed, a log is generated which stores the results of the updated transaction that is reflected in the MMDBS's main-memory. At this point, the update transaction acquires a particular mutex from mutex array Q based on the current timestamp value assigned to the update transaction, for example, a timestamp value of 1. Also, the update transaction updates the timestamp value associated with the data item the transaction updated to the timestamp of the update transaction—in this example a value of 1. After the update transaction acquires Q[1], it releases the database mutex thereby allowing another transaction to access the database.

If at this time a read transaction requires access to the data item previously updated by the preceding update transaction, it first acquires the database mutex that was released by the predecessor update transaction. The read transaction then begins and executes its transaction processing steps using the data item. Once the read transaction processing is complete, the read transaction releases the data base mutex.

Before it is determined that the read transaction has read "committed" data, i.e. data that a predecessor update transaction has flushed to disk, the read transaction must acquire the mutex from array Q based on the timestamp of the data item itjust read, which in this example is Q[1]. However, the read transaction cannot acquire mutex Q[1] until the update transaction flushes the log to commit the updated data to disk and thereafter releases mutex Q[1]. Because the read transaction cannot complete until the updates performed by the update transaction are flushed to disk and committed, when the read transaction does complete it is guaranteed that the read transaction read committed data. After the update transaction flushes the log, it releases mutex Q[1] which indicates that the updated data was committed. Once mutex Q[1] is released, the read transaction can complete by acquiring and immediately releasing mutex Q[1].

If before the update transaction releases Q[1] a read transaction requires access to a data item that is not in the process of being committed by an update transaction then when that transaction commits, it acquires and releases the mutex from the queue. That is, it is not blocked.

To see that the SP of the present invention ensures serializability, observe that there is no concurrent database access because at most one transaction is ever in the active state update transactions commit in timestamp order and no transaction commits in the state of having read uncommitted data. Notice also that read-only transactions release the database mutex prior to acquiring a mutex in Q. As such, they do not block other transactions while waiting to commit. Similarly—and for the same reason—update transactions release the database mutex before flushing the log. Finally, in order to ensure that update transactions do not block while holding the database mutex, the array Q should generally be larger than the maximum multi-programming level (i.e. the number of simultaneous transaction that can be run on the system) so that subsequent update transactions can acquire a mutex from array Q having an incremented timestamp.

Thus, by using the SP of the invention, a protocol is provided in which transactions execute serially, no transaction commits having read uncommitted data and performance is improved by allowing the overlap of transaction steps of copending update and read transactions.

In order to evaluate the benefits of the serial protocol of the present invention, a series of experiments using the existing MMDBS referenced above at page 4 was performed. Normally, this MMDBS uses strict 2PL for concurrency control. However, this existing MMDBS also supports the ability to turn off locking, offers control over the point at which logging operations are performed and provides an efficient, user-level semaphore implementation. Using these features, the SP protocol was implemented on top of the existing, lower-level primitives of this existing MMDBS. This provided a single platform whose behavior could be toggled between strict 2PL and SP in order to compare the performance of each protocol.

An experimental database was formed and consisted of a single hash table, with 20,000 entries (each consisting of 64 bytes). Also, the multi-programming level was varied from 1 to 35. Before a transaction started, each transaction determined randomly whether it was a read only or an update transaction (according to some given probability, which was also varied). Each transaction probed 20 entries in the table, reading each entry if it was a read transaction, and updating each entry if it was an update transaction. The experiment was designed to simulate the workload generated by telecommunications applications such as those discussed above. In order to avoid the possibility of deadlock distorting our results in the strict 2PL case, table entries were probed sequentially (which is a somewhat artificial, but necessary compromise).

In the first set of experiments, the maximum throughput for this MMDBS using the SP of the present invention and strict 2PL was measured as a function of both the multi-programming level and the update rate. The results are illustrated in FIGS. 3(a)–3(d) which show the results for multi-programming levels of 1, 5, 15 and 35, respectively.

For low update percentages, the change in multi-programming level has a marginal effect on the throughput (due mainly to the additional overhead of context switching). For high update percentages, however, the multi-programming level has a significant effect on throughput. For both SP and strict 2PL, throughput increases with the multi-programming level because as more processes are added, the probability that all of them are blocked on logging operations decreases. However, as throughput increases, the effect of the locking overhead also becomes increasingly apparent and at a multi-programming level of 35, the throughput of SP is double that of strict 2PL.

Throughput and response time are integrally related. In a second series of experiments, the throughput was varied, and the average response time was measured. In particular, each process was adapted such that a random delay was added after it completes one transaction, but before it starts the next. In general, by increasing this (random) delay, throughput is decreased, and response-time is improved; and vice versa The actual delay is in fact immaterial. Rather, for each particular delay, both throughput and response time were measured. The results of the experiment are shown in FIGS. 4(a)–4(d) for updates rates of 2%, 10%, 33%, and 100% respectively, and a multi-programming level of 35. Response time is plotted separately for read and for update transactions (there are no read transactions in FIG. 4(d)). The scales on they-axes are logarithmic.

In the range of throughput rates where response time comparisons can be made, SP offered significant response time improvements, for a given throughput, over strict 2PL. For example, in FIG. 4(b), which illustrates an update rate of 10%, at 20 transactions per second the response time for read-only transactions is 6 milliseconds in the case of SP, compared to 30 milliseconds in the case of strict 2PL. The response time for update transactions is 50 milliseconds in the case of SP, compared to almost 200 milliseconds in the case of strict 2PL. Thus, both throughput and response time improve when the SP of the present invention B used instead of prior art locking techniques.

Although the description of the SP of the present invention was in relation to a computer with a single processor (albeit multi-threaded), the benefits of SP also apply to a computer having multiple processors. This result is counter to the prevailing view that a serial based protocol cannot exploit the parallelism of multiprocessor systems because if transactions execute serially, then at most one processor can be busy at any time, leaving the additional processors idle.

To demonstrate the benefits of the SP of the present invention on a multiprocessor system, a series of experiments were performed which help quantify and understand the trade-offs of concurrency and serial execution in multiprocessor systems. Unlike the experiments reported above, those reported here are based on an analytical model, driven by real call-data traces. In general, each transaction goes through three phases; waiting, processing and logging. The model used models only the waiting and processing phases. Thus, "response time" here refers to the time until a transaction decides to commit (the actual response time may be longer because of logging). Note that, if the use of precommit, is assumed then the effect of logging on response time is additive, but not cumulative (unless the log device itself is overloaded).

A critical factor in these experiments is the ratio of the service time for transactions with locking to the service time of transactions without locking, which is called the 'service-time ratio'. Based on the left-most measurements in FIG. 3(a), we used a service-time ratio of 7:1 in the experiments reported here (i.e. if the service time for a transaction is 14 ms with locking, then the service time is 2 ms without locking). For different systems, of course, this ratio will vary, and the results reported here will vary accordingly. In general, however, because of the cumulative effect of queuing times, a higher service-time ratio can have an exaggerated effect on response times.

The first experiment performed was to measure the effect on average response time of using additional processors. This was done for two different workloads and for four different update rates. The two workloads used were: (1) a workload generated from 1 day's worth of call data, and (2) a synthetic workload generated with the same arrival distribution, but with each transaction in turn accessing different entries in the database sequentially. The important property of the second workload is that it is the same as the first, but without data contention. The update rates used were 100% updates, 50% updates, 10% updates, and 1% updates.

Figure 5A:
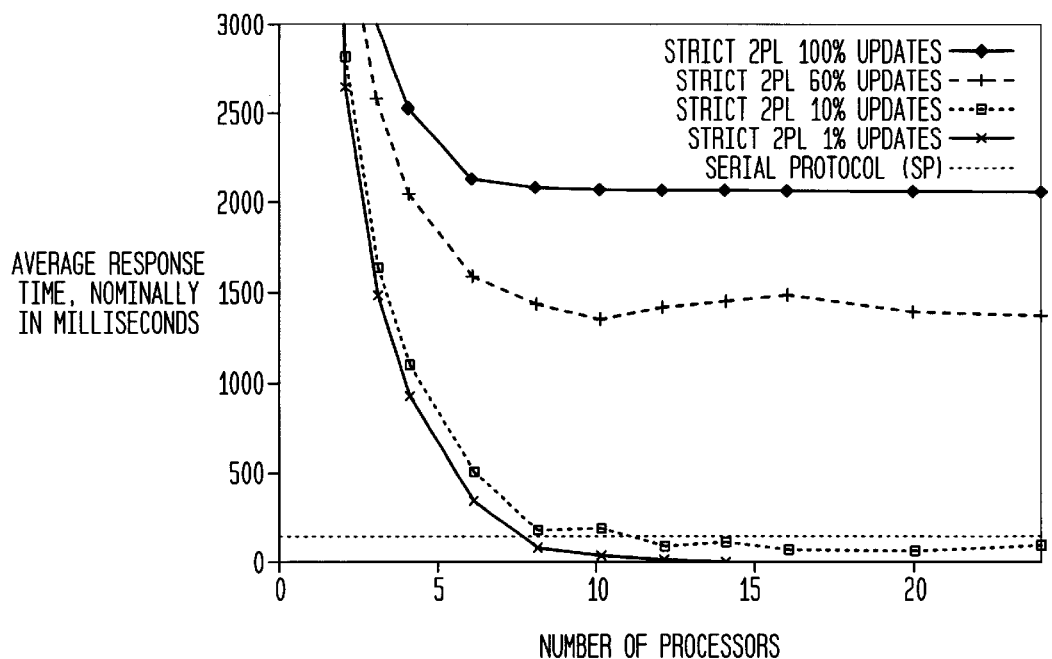
FIG. 5(*a*) is a graph showing the average response time as a function of the number of processors for a call-data workload using the serial protocol of the present invention.
Figure 5B:
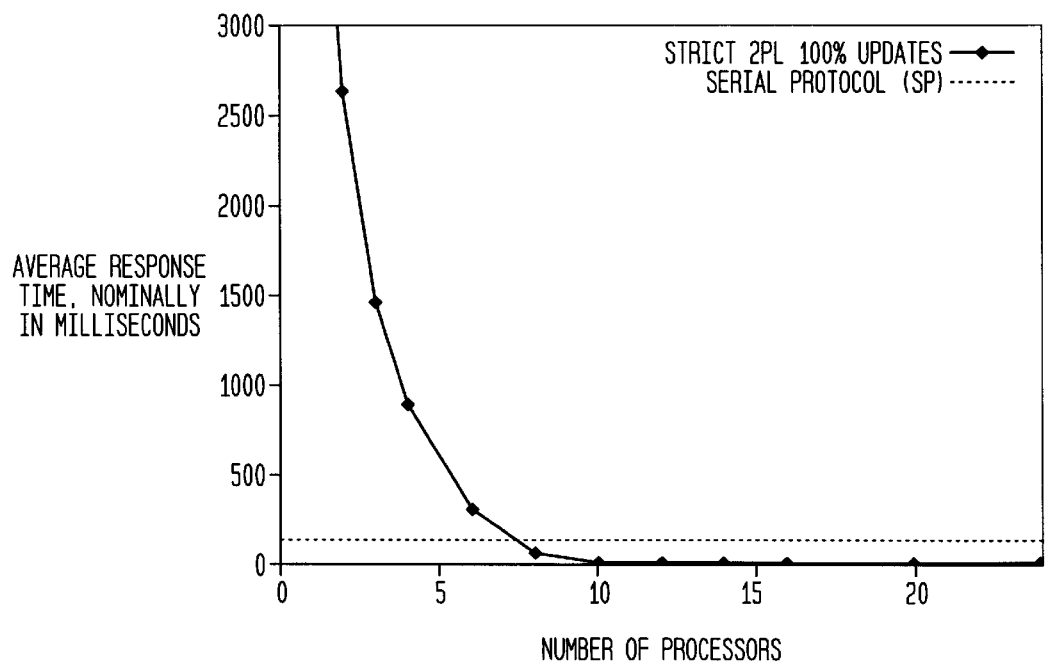

The results of this first experiment are presented in FIGS. 5(a)–5(b). First, note that the average response time using SP of the present invention is unaffected by changes in the number of processors, or by changes in the degree of contention between transactions; it is 133 ms in all cases. Second, observe that the key factor affecting average response time in the case of locking is the degree of data contention between transactions. If contention is low, then the potential for parallelism is high, and strict 2PL can exploit that parallelism. If, on the other hand, contention is high, then the potential for parallelism is low, and many transactions must be executed serially (even under strict 2PL). This effect can be observed in FIG. 5(a), where average response time is lower, in the case of locking, with lower percentages of update transactions. Locking delivered better response times than SP with 10% of transactions performing updates and more than around 10 processors, and with 1% of transactions performing updates and more than around 7 processors. In FIG. 5(b) the average response time for locking is unaffected by the update rate because, in the absence of contention, transactions only block waiting for processors (not locks). As a result, with more than around 7 processors, the additional concurrency allowed by locking led to much improved average response times. In fact, at the tail of this graph, the average response time is 14 ms (which is the average service time which we used). Moreover, the cross-over point at 7 processors corresponds to the service-time ratio.

With single-processor, main-memory systems and each transaction performing the same amount of work, first-come/first-served serial scheduling is optimal. This is not the case, however, with multiprocessor systems. In fact, for the SP cases reported above, at most one processor is ever busy processing transactions. For this reason, an extended version of SP in which update transactions execute strictly sequentially as before, but read-only transactions execute in parallel, is considered. To achieve this extension, the SP algorithm described above is adapted such that database access is controlled not by a mutex, but by a single-writer, multiple-readers semaphore (effectively, there is one shared/exclusive lock for the entire database).

Figure 6A:
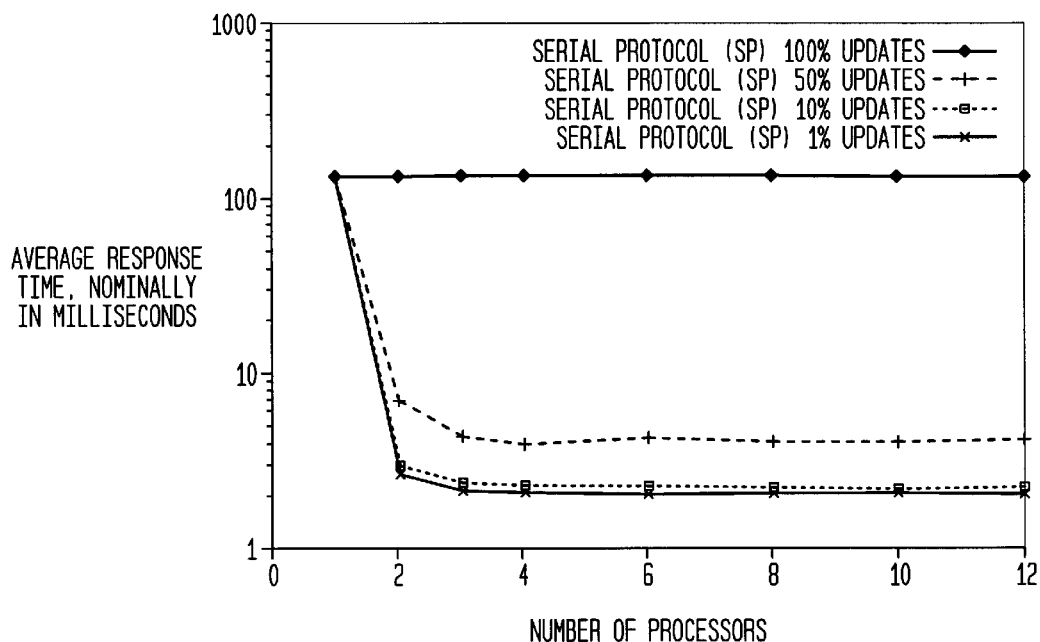
FIG. 6(*a*) is a graph showing the average response time as a function of the number of processors for a call-data workload with concurrency between readers using the serial protocol of the present invention.
Figure 6B:
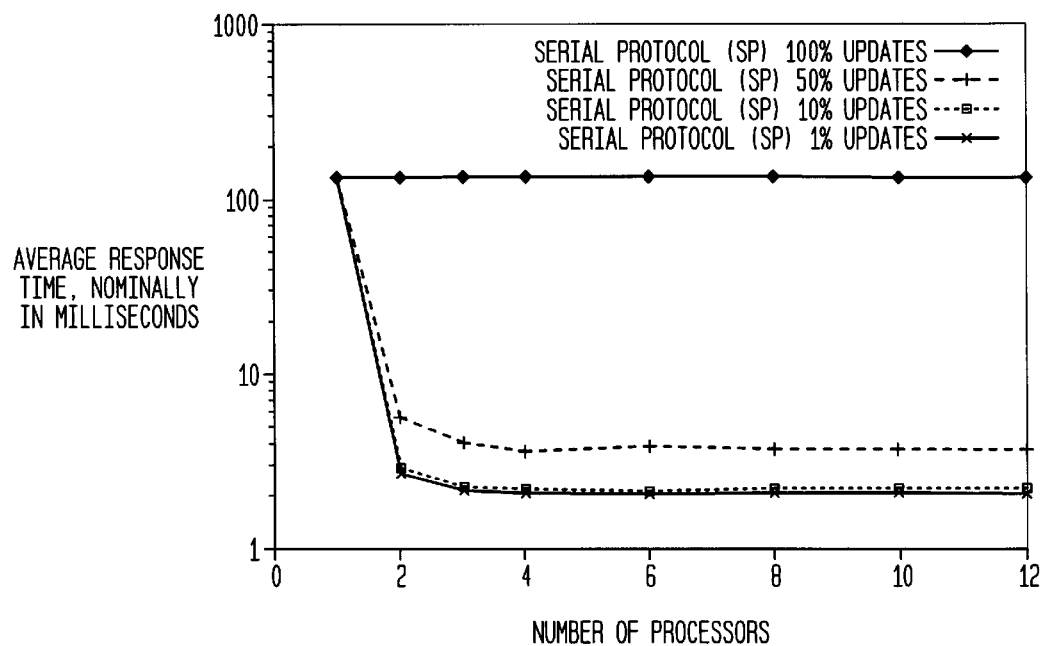

The effect of this change is illustrated, for the same two workloads, in FIGS. 6(a)–6(b) (the scales on the y-axes are now logarithmic). With 100% update transactions, average response time is unaffected (there are no readers to benefit from additional concurrency). However, with just a few readers able to execute in parallel (for 50% updates and less), queuing times are starkly reduced, and average response times improve accordingly, even with just a few processors. At low update rates, the average response time approaches the service time (of 2 ms). In this experiment, the effect of contention is marginal.

In another MMDBS system—which is based on the existing MMDBS referenced above at page 4 and 14,—parallelism is introduced at a high level (See Jerry Baulier, Stephen Blott, Henry F. Korth, and Avi Silberschatz, A Database System For Real-Time Event Aggregation in Telecommunication, Proceedings of the *International Conference on Very Large Databases* (VLDB), New York, NY, USA, August 1998; Jerry Baulier, Stephen Blott, Henry F. Korth, and Avi Siberschatz, Sunrise: A Real-Time Event-Processing System, *The Bell Labs Technical Journal*, 3(1), January–March, 1998). In this other MMDBS, the database is partitioned into a number of sub-databases, usually based on some key attribute such as a customer identifier or a telephone number. A separate instance of the existing MMDBS described above is used for each sub-database, and the vast majority of transactions can be processed at a single site only. This shared-nothing architecture allows this other MMDBS to be scaled up for workstation-cluster architectures. Another possibility, however, is to use the same technique to allow multiple sub-databases to coexist on a single multiprocessor machine. Each individual sub-database might use SP, but parallelism is possible between sub-databases.

Figure 7A:
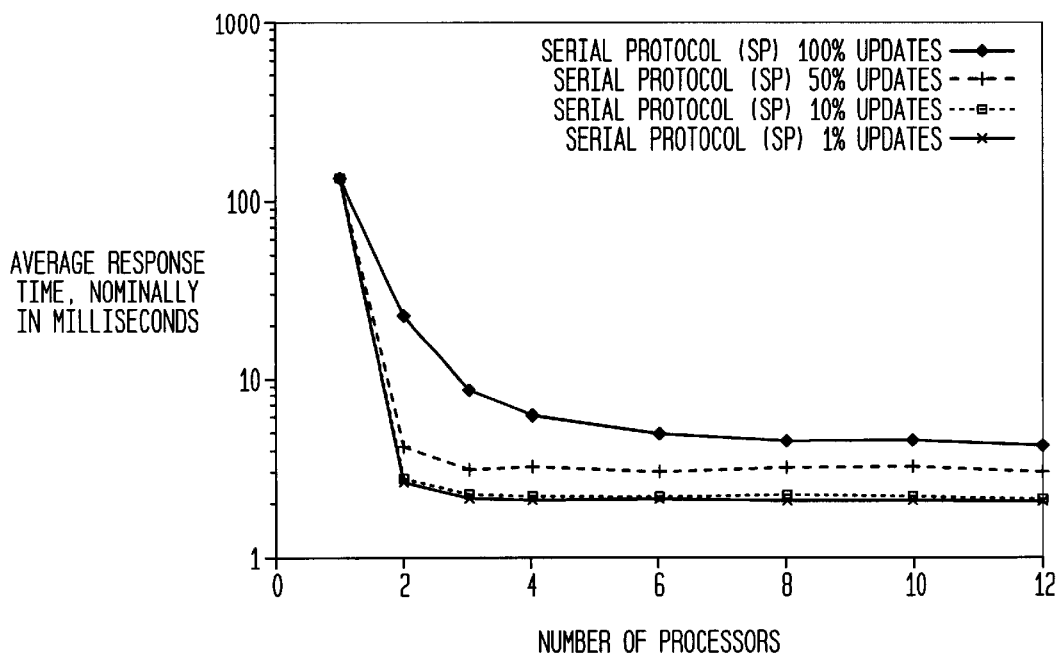
FIG. 7(*a*) is a graph showing the average response time as a function of the number of processors for a call-data workload with concurrency between readers with one database site per processor using the serial protocol of the present invention.
Figure 7B:
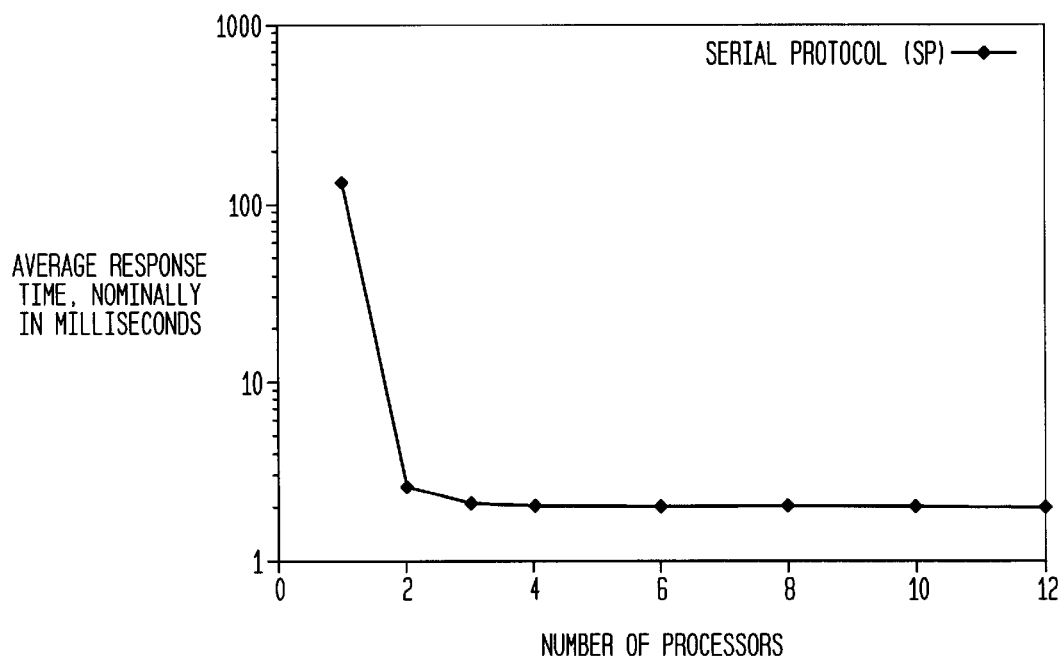

Assuming that a database and its workload can be partitioned in this way, the case of running one database instance (which is called a 'site') for every processor is considered. Because each site has a separate database mutex (or semaphore), this partitioning introduces the possibility of parallelism not just between readers, but also between writers. The same experiment was repeated, but with this extension. The results are illustrated in FIGS. 7(a)–7(b) (the scales on the y-axes are again logarithmic). Because of the additional possibility of parallelism between update transactions, this technique demonstrates significant improvement in average response time for all workloads. In FIG. 7(b), because of the lack of contention, the average response time is unaffected by the update rate. It is noted that, with more than around three processors (and for the workload assumed here), the average response time using SP is lower, in all cases, than the service time using strict 2PL (14 ms).

Figure 8:
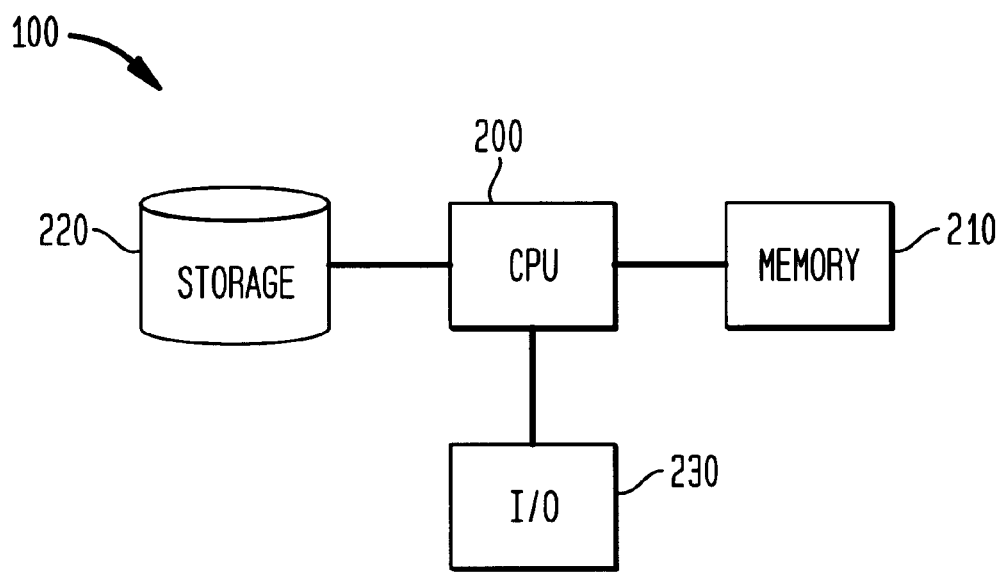
FIG. 8 is an exemplary block diagram of a system in accordance with the present invention.

The present invention can, as will be recognized by the routineer in the art, be implemented as part of a computer system of a type known in the art, as depicted for example in FIG. 8. In FIG. 8, a system 100 used for practicing the present invention is depicted comprising a central processing unit (CPU) 200 connected to a main memory 210 and a storage device 220 which may be any digital storage media known for storing digital program code, databases, data files and other information in digital form. An input/output (I/O) device 230 is also connected to the system which may be any known device for inputting information to the system and/or for retrieving information from the system, in visual, audio or symbolic form. Digital program code for running a MMDBS in accordance with the present invention as described above, either as software, integrated circuit logic, firmware of some combination thereof, may be stored on said storage device 220 and/or in said main memory 210 for execution by said CPU 200. Multiple processors (not shown) may also be utilized.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A method of operating main-memory database system having at least one database containing at least one modifiable data item, comprising the steps of:

causing an update transaction to acquire a database mutex before said update transaction modifies said data item;

assigning a timestamp having an associated timestamp mutex to said update transaction;

assigning said timestamp to said data item;

causing said update transaction to acquire said timestamp mutex before said update transaction releases said database mutex;

causing said update transaction to release said database mutex before an update result is stored to a storage device; and causing said update transaction to release said timestamp mutex after said update result is stored to said storage device.

2. The method of claim 1, further comprising the steps of:

executing a read transaction for reading said data item;

causing said read transaction to acquire said database mutex before said read transaction reads said at least one data item; and causing said read transaction to acquire and release said timestamp mutex before said read transaction terminates.

3. The method of claim 1, wherein said database further comprises a second modifiable data item, the method further comprising the steps of:

causing a second update transaction to acquire said database mutex before said second update transaction modifies a second data item;

assigning a second timestamp having an associated second timestamp mutex to said second update transaction;

assigning said second timestamp to said second data item;

causing said second update transaction to acquire said second timestamp mutex before said second update transaction releases said database mutex;

causing said second update transaction to release said database mutex before a second update result is stored to said storage device; and causing said second update transaction to release said second timestamp mutex after said second update result is stored to said storage device.

4. The method of claim 1, further comprising the steps of:

providing an array of mutexes; and selecting as said timestamp mutex a mutex from said array having a position in said array indexed by said at least one timestamp.

5. The method of claim 4, wherein said system can execute N simultaneous update transactions and said array of mutexes has a size of at least N.

6. The method of claim 1, wherein the step of requiring the update transaction to acquire said mutex associated with at least one timestamp comprises the step of causing said update transaction to change said timestamp mutex in order to indicate that said data item is not yet stored to said storage device.

7. The method of claim 1, wherein the step of requiring the update transaction to release said timestamp mutex comprises the step of requiring said update transaction to change said timestamp mutex in order to indicate that said data item is stored to said storage device.

8. The method of claim 1, wherein said system is a multiple processor system.

9. A main memory database system comprising:

a main memory;

a central processing unit;

a storage device;

a database containing at least one modifiable data item at least partially stored on said storage device;

means for causing an update transaction to acquire a database mutex before said update transaction modifies said data item;

means for assigning a timestamp having an associated timestamp mutex to said update transaction;

means for assigning said timestamp to said data item;

means causing said update transaction to acquire said timestamp mutex before said update transaction releases said database mutex;

means for causing said update transaction to release said database mutex before an update result is stored to said storage device; and means for causing said update transaction to release said timestamp mutex after said update result is stored to said storage device.

10. The system of claim 9, further comprising:

means for executing a read transaction for reading said data item;

means for causing said read transaction to acquire said database mutex before said read transaction reads said at least one data item; and means causing said read transaction to acquire and release said timestamp mutex before said read transaction terminates.

11. The method of claim 9, further comprising:

a second modifiable data item;

means for causing a second update transaction to acquire said database mutex before said second update transaction modifies a second data item;

means for assigning a second timestamp having an associated second timestamp mutex to said second update transaction;

means for assigning said second timestamp to said second data item;

means for causing said second update transaction to acquire said second timestamp mutex before said second update transaction releases said database mutex;

means for causing said second update transaction to release said database mutex before a second update result is stored to said storage device; and means for causing said second update transaction to release said second timestamp mutex after said second update result is stored to said storage device.

12. The system of claim 9, further comprising:

an array of mutexes; and means for selecting as said timestamp mutex a mutex from said array having a position in said array indexed by said at least one timestamp.

13. The system of claim 12, further comprising means for executing N simultaneous update transactions and wherein said array of mutexes has a size of at least N.

14. The system of claim 9, wherein said means for causing the update transaction to acquire said mutex associated with at least one timestamp comprises means for causing said update transaction to change said timestamp mutex in order to indicate that said data item is not yet stored to said storage device.

15. The system of claim 9, wherein said means for causing the update transaction to release said timestamp mutex comprises means for causing said update transaction to change said timestamp mutex in order to indicate that said data item is stored to said storage device.

16. The system of claim 9, wherein said system further comprises a second processor.

* * * * *